United States Patent [19]

Wilschut

[11] 4,131,635

[45] Dec. 26, 1978

[54] THERMOSETTING POLYESTER COMPOSITIONS

[75] Inventor: Frits M. W. Wilschut, Heenvliet, Netherlands

[73] Assignee: Synres International B.V., Hoek van Holland, Netherlands

[21] Appl. No.: 762,791

[22] Filed: Jan. 25, 1977

[51] Int. Cl.² .................. C08L 67/06; C08K 00/00
[52] U.S. Cl. ..................... 260/862; 260/872; 260/40 R
[58] Field of Search .................. 260/862, 872

[56] References Cited

U.S. PATENT DOCUMENTS

| | | | |
|---|---|---|---|
| 2,882,256 | 4/1959 | Waychoff | 260/872 |
| 3,225,117 | 12/1965 | Harper | 260/872 |
| 3,551,378 | 12/1970 | Rabenold et al. | 260/862 |
| 3,772,241 | 11/1973 | Kroekel | 260/862 |
| 3,883,612 | 5/1975 | Pratt et al. | 260/862 |
| 3,928,254 | 12/1975 | Takayama et al. | 260/862 |
| 3,956,421 | 5/1976 | Roberts et al. | 260/862 |

FOREIGN PATENT DOCUMENTS 887693  12/1971  Canada ........................ 260/862

*Primary Examiner*—Hosea E. Taylor
*Assistant Examiner*—Amelia B. Yarbrough
*Attorney, Agent, or Firm*—Cushman, Darby & Cushman

[57] ABSTRACT

Thermosetting moulding material comprising an unsaturated polyester, a copolymerizable vinyl monomer and other additives are disclosed which contain as a shrinkage-reducing additive a copolymer of styrene with 2 to 10% by weight of an unsaturated monocarboxylic acid, and 15 to 40% by weight of a dialkyl ester of an unsaturated dicarboxylic acid. These compositions may be used as casting resins, in dough-moulding and in sheet-moulding to prepare dimensionally stable objects with a smooth surface and homogeneous coloration.

9 Claims, No Drawings

THERMOSETTING POLYESTER COMPOSITIONS

BACKGROUND OF THE INVENTION

The invention relates to thermosetting moulding material based on an unsaturated polyester, a copolymerisable vinyl monomer, a catalyst, a shrinkage-reducing additive, and, if necessary, other usual additives.

It is known that moulding materials based on unsaturated polyesters in combination with copolymerisable vinyl monomers shrink to a greater or lesser degree when cured. As a result of this the surface of the resulting moulded articles prepared is not quite smooth, while the whole article tends to become warped and is no longer true to size. Further, this effect causes ribs, injection sprues and fibrous reinforcing agents to be marked on the surface. It has been proposed to oppose these disadvantages by adding a shrinkage-resisting additive ('low-profile additive') to the system. It has already been proposed to add polyvinyl chloride, polyvinyl acetate, polylactones, polymethacrylates, polystyrene, copolymers of maleic acid anhydride and styrene, copolymers of acrylic acid or methacrylic acid with acrylates or methacrylates, and other thermoplasts, as 'low-profile' additives. However, various additives bring the drawback that, though they oppose shrinkage, they are subject to exudation during the processing, so that the surface of the moulded articles is not smooth any more and, in some cases, even adheres to the mould. Also, a disadvantage occurring in case of coloured moulding materials is that owing to the phase separation between additive and polyester the coloration is no longer homogeneous, so that the moulded article shows stains and colour shifts.

The object of the invention is a shrinkage-resisting additive which does not show said disadvantages or to a much lesser degree.

DETAILED DESCRIPTION OF THE INVENTION

According to the invention thermosetting moulding materials based on an unsaturated polyester, a copolymerisable vinyl monomer, a shrinkage-resisting additive, catalysts, and other usual additives, are obtained with application as shrinkage resisting additive of a copolymer of 2 to 10% by weight of a polymerisable monocarboxylic acid with 3 to 6 carbon atoms, 15 to 40% by weight of a dialkyl ester of an unsaturated polymerisable dicarboxylic acid with 4 to 9 carbon atoms, in which the alkyl groups may or may not be branched and contain 1 to 8 carbon atoms and as third monomer styrene or a mixture of styrene and minor amounts of one or more other monomers.

These thermosetting moulding materials according to the invention show little shrinkage and are excellently colorable and can be processed to homogeneously coloured moulded articles with a smooth surface, which are true to size.

The objects formed can be easily removed from the mould. In general, application of moulding materials according to the invention leads to formation of objects of a good quality and to reduction of production loss.

The additive consists of a copolymer of 2 to 10% by weight, and preferably 3 to 8% by weight, of an unsaturated polymerisable monocarboxylic acid with 3 to 6 carbon atoms, such as acrylic acid, methacrylic acid or crotonic acid, acrylic acid being the preferred acid. The second component of the copolymer is a dialkyl ester of an unsaturated polymerisable dicarboxylic acid with 4 to 9 carbon atoms, in which the alkyl groups may or may not be branched and contain 1 to 8 carbon atoms, and is applied in a quantity of between 15 and 40% by weight, preferably of between 20 and 25% by weight. As dicarboxylic acids for instance fumaric acid, maleic acid, or itaconic acid can be applied. The alkyl groups may, for instance, be derived from propanol, n-butanol, isobutanol, n-pentanol, n-octanol or 2-ethylhexyl alcohol. The best results are achieved with those alkyl esters that are derived from an aliphatic alcohol, whether or not branched, with 3 to 6 carbon atoms. Generally, the easily copolymerisable dialkyl fumarates are preferred. Examples thereof are: di-n-propyl fumarate, di-n-butyl fumarate, di-isobutyl fumarate, and di-hexyl fumarate. As third monomer styrene is used in most cases. If desired, a mixture of styrene and minor (less than 10%) quantities of another monomer, like vinyl toluene or alpha-methyl styrene, may be applied. Very good results are achieved with application as 'low-profile' additive of a copolymer consisting of 4 to 8% by weight of acrylic acid, 20 to 25% by weight of dialkyl fumarate, and styrene. The composition of the additive depends also on the system in which it is to be applied.

With coloured compositions optimum results are achieved if the refractive index of the additive is about equal to the refractive index after the curing of the mixture of the unsaturated polyester and the vinyl monomer. By preference, the difference in refractive index is distinctly less than 1.5%. As a rule of thumb can be applied that, preferably, the weight percentage of dialkyl ester in the additive (solid) is comparable to the weight percentage of unsaturated dicarboxylic acid in the polyester (solid).

The additive can be prepared in various ways, e.g. by emulsion polymerisation, bead polymerisation, polymerisation in solution or in the mass. Since the additive is preferably applied in the form of a solution in a liquid vinyl monomer, the additive is, by preference, prepared by polymerisation in the mass or in solution. Polymerisation in solution is easily feasible and facilitates control of the reaction conditions. Polymerisation in the mass is slightly less easily feasible, but has the advantage that it is not necessary to replace an inert solvent by the vinyl monomer. In the preparation, the formation of homopolystyrene should be suppressed. This can be achieved, for instance, by supplying styrene at least as rapidly as the other monomers. In order to facilitate the supply of the additive the copolymer is dissolved in the vinyl monomer. The concentration is not of importance here.

Shortly before the processing of the moulding material, the additive is added to the solution of the polyester in the vinyl monomer, usually in the form of a solution of the copolymer in styrene. The quantity of additive applied varies generally between 10 and 100% by weight referred to the unsaturated polyester, and amounts in most cases to between 20 and 65% by weight.

As unsaturated polyester the conventional thermosetting esters can be applied, such as the condensation products of an unsaturated dicarboxylic acid, possibly mixed with saturated dicarboxylic acid, and polyols. For dicarboxylic acids, maleic acid, fumaric acid, itaconic acid and, possibly, the anhydrides are to be considered, usually in combination with aliphatic and/or aromatic dicarboxylic acids, like adipic acid, sebacic acid, succinic acid, orthophtalic acid, isophthalic acid, terephthalic acid, and anhydrides, and, possibly, also chlorinated dicarboxylic acids, such as tetrachlorophthalic acid, or Het-acid. For polyols, ethylene glycol, propylene glycol, butylene glycol, diethylene glycol, triethylene glycol, dipropylene glycol, or higher polyoxyalkylene glycols are applied in most cases. In many cases also a small amount of a trifunctional or tetrafunctional alcohol is applied, like trimethylol propane or pentaerytritol.

In practically all cases styrene is applied as copolymerisable vinyl monomer. If necessary, the styrene may have been partly replaced by acrylonitrile, vinyl toluene, alpha-methyl-styrene, methylmethacrylate, triallylisocyanurate, or triallylcyanurate.

For catalyst known catalysts can be applied, like peroxidic compounds, e.g. tertiary butylperbenzoate or tertiary butylcumylperoxide. In most cases, also accelerators are applied, such as cobalt compounds or tertiary amines. In most cases, also chemical thickening agents are added, which thicken the system to a dough-like consistency. Examples thereof are the alkaline earth compounds, such as magnesium oxide and calcium hydroxide. The moulding materials also contain fillers and reinforcing agents in most cases, like glass fibre, glass fabric, titanium oxide or chalk. In addition, also the usual additives may be present, such as release agents, pigments, gloss-improving agents and the like.

The gel time and the curing time strongly depend on the catalyst and accelerator applied. In most cases, these are so chosen that the material cures rapidly at temperatures of between 100° C. and 250° C., more particularly of between 125° C. and 175° C.

The moulding materials according to the invention can be applied in both the processing of prethickened materials (dough-moulding method) and the processing of impregnated glass fibre mats (sheet-moulding method), and as casting material.

The invention will be elucidated in more detail with the aid of the following examples.

EXAMPLE I 460 grams of toluene are heated in a flask to the reflux. As soon as the reflux temperature has been reached, the addition of 440 grams of styrene and of a mixture of 140 grams of toluene, 30 grams of acrylic acid, 130 grams of di-isobutyl fumarate and 10 grams of azobisisobutyronitrile is started. The addition of styrene takes 4 hours, the addition of the mixture of other monomers 5 hours. Next, the reaction mixture is still heated for some time at a temperature of between 110° and 120° C. until the required viscosity has been reached. Thereupon, the toluene is distilled off, the remaining dry substance being poured out onto a metal plate, pulverized and subsequently dissolved in a mixture of 900 grams of styrene and 50 ppm of paratertiary butylcatechol. In this way a clear solution of an additive having a refractive index of 1.5546, a viscosity of 37.2 P and a solid content of 40.8% is obtained.

EXAMPLE II 46 kg of toluene are heated in a reservoir to a temperature of between 110° and 120° C. whilst inert gas is passed through. Subsequently, in the course of 4 hours, a mixture of 44 kg of styrene, 14 kg of toluene, 3 kg of acrylic acid, 13 kg of di-n-butyl fumarate, and 0.8 kg of azo-bis-iso-butyronitrile, is added. The heating of the mixture is continued until the viscosity is about 55 P. Next, the toluene is distilled off and the copolymer poured out onto a metal plate, pulverized and dissolved in a mixture of 90 kg of styrene and 3 grams of paratertiary butyl catecnol. In this way a clear solution of the additive having a solid content of about 40% by weight, a viscosity of about 22 P and a refractive index of 1.5553 is obtained.

EXAMPLE III

A mixture of 25 parts by weight of the solution of the copolymer in styrene obtained according to exmple II, 75 parts by weight of a 60 w % solution in styrene of an unsaturated polyester based on maleic acid anhydride, phthalic acid anhydride and propylene glycol having a refractive index of 1.538 (Synolite-S-545 from Synres Nederland BV) and 1.2 parts by weight of tert. butylcumylperoxide, was cured in a mould. The moulded article thus obtained was smooth, dimensionally stable and clear-transparent. Upon repetition of the test, now however with a polyester of the same type (Synolite S-400 from Synres Nederland BV) having a refractive index of 1.532, a smooth, dimensionally stable, but hazy moulded article was obtained. Comparable results were obtained with application of the additive obtained according to example I.

EXAMPLE IV

In the way described in example II a 40 w. % solution in styrene was prepared of a copolymer of acrylic acid, diisobutyl fumarate, di-n-butyl maleate and styrene (5:17:11.3:66.6). Moulding material was prepared by mixing 40 parts by weight of this solution, 60 parts by weight of a 60 w. % solution in styrene of Synolite-400, 1.26 parts by weight of tert. butylcumyl peroxide, 1.26 parts by weight of magnesium oxide, 3 parts of zink stearate, 5 parts of titanium dioxide-pigment, 140 parts of ground chalk, 105 parts of glass fibre, and 8 parts of styrene, and allowing this to become prethickened. The material was cured in 5 minutes at 140–150° C. and a pressure of 100 kg/cm$^2$ to form a sheet reinforced with ribs at the bottom, which could be easily removed from the mould. The surface was smooth, without marking of the ribs or of the glass firbres. The sheet was stable in shape and dimension.

What is claimed is:

1. In thermosetting molding compositions composed of (a) a thermosetting polyester copolymer containing copolymerized styrene, (b) a shrinkage-reducing agent, and (c) a curing catalyst the improvement wherein said shrinkage-reducing agent is present in an amount of from 10 to 100% by weight based on the weight of said unsaturated polyester copolymer and is a copolymer of (i) 2 to 10% by weight of an olefinically unsaturated monocarboxylic acid containing 3 to 6 carbon atoms (ii) about 15 to 40% by weight of a dialkyl ester of an unsaturated dicarboxylic acid, in which each alkyl moiety contains 1 to 8 carbon atoms and the dicarboxylic acid moiety contains 4 to 9 carbon atoms, and (iii) the balance being styrene or a mixture of styrene with a minor amount of at least one other monomer.

2. A molding composition according to claim 1, wherein said alkyl moiety is a branched chain alkyl radical.

3. A molding composition according to claim 1, further containing solid filler material.

4. A molding composition according to claim 1, in which said shrinkage-reducing agent is a copolymer containing from 4 to 8% by weight of said olefinically unsaturated carboxylic acid, from 20 to 25% by weight of said dialkyl ester of an olefinically unsaturated dicarboxylic acid, the balance being styrene.

5. A molding composition according to claim 1, in which said shrinkage-reducing agent is a copolymer of acrylic acid with a dialkyl ester of fumaric acid, in which each alkyl moiety contains from 3 to 6 carbon atoms.

6. A molding material according to claim 1, in which the refractive index of said shrinkage-reducing agent is about equal to the refractive index, after curing of the mixture of said unsaturated polyester copolymer.

7. A molding material according to claim 1, in which said shrinkage-reducing agent is present in an amount of from 25 to 65% by weight, based on the weight of said unsaturated polyester copolymer.

8. A molded article obtained by forming and curing a molding material according to claim 1.

9. A shrinkage-reducing agent for use with thermosetting molding compositions containing copolymerized styrene and a curing catalyst, which is a copolymer of (i) 2 to 10% by weight of an olefinically unsaturated monocarboxylic acid containing 3 to 6 carbon atoms (ii) about 15 to 40% by weight of a dialkyl ester of an unsaturated dicarboxylic acid, in which each alkyl moiety contains 1 to 8 carbon atoms and the dicarboxylic acid moiety contains 4 to 9 carbon atoms, and (iii) the balance being styrene or a mixture of styrene with a minor amount of at least one other monomer.

* * * * *

UNITED STATES PATENT AND TRADEMARK OFFICE
CERTIFICATE OF CORRECTION

PATENT NO. : 4,131,635
DATED : December 26, 1978
INVENTOR(S) : Frits M.W. Wilschut It is certified that error appears in the above-identified patent and that said Letters Patent are hereby corrected as shown below:

Claim 1 is corrected to read as follows:

1. In thermosetting molding compositions composed of (a) a thermosetting unsaturated polyester copolymer containing [copolymerized] copolymerizable styrene, (b) a shrinkage-reducing agent, and (c) a curing catalyst the improvement wherein said shrinkage-reducing agent is present in an amount of from 10 to 100% by weight based on the weight of said unsaturated polyester copolymer and is a copolymer of (i) 2 to 10% by weight of an olefinically unsaturated monocarboxylic acid containing 3 to 6 carbon atoms (ii) about 15 to 40% by weight of a dialkyl ester of an unsaturated dicarboxylic acid, in which alkyl moiety contains 1 to 8 carbon atoms and the dicarboxylic acid moiety contains 4 to 9 carbon atoms, and (iii) the balance being styrene or a mixture of styrene with a minor amount of at least one other monomer of vinyl toluene or alpha-methyl styrene.

Claim 3 is corrected to read as follows:

3. A molding composition according to claim 1, further containing solid filler material of the class consisting of glass fiber, glass fabric, titanium oxide and chalk.

UNITED STATES PATENT AND TRADEMARK OFFICE
CERTIFICATE OF CORRECTION

PATENT NO. : 4,131,635
DATED : December 26, 1978
INVENTOR(S) : Frits M.W. Wilschut It is certified that error appears in the above-identified patent and that said Letters Patent are hereby corrected as shown below:

Claim 9 is corrected to read as follows:

9. A shrinkage-reducing agent for use with thermosetting unsaturated polyester molding compositions containing co-[polymerized] polymerizable styrene and a curing catalyst, which is a copolymer of (i) 2 to 10% by weight of an olefinically unsaturated monocarboxylic acid containing 3 to 6 carbon atoms (ii) about 15 to 40% by weight of a dialkyl ester of an unsaturated dicarboxylic acid, in which each alkyl moiety contains 1 to 8 carbon atoms and the dicarboxylic acid moiety contains 4 to 9 carbon atoms, and (iii) the balance being styrene or a mixture of styrene with a minor amount of at least one other monomer of vinyl toluene or alpha-methyl styrene.

Signed and Sealed this

Twelfth Day of June 1979

[SEAL]

Attest:

RUTH C. MASON
Attesting Officer

DONALD W. BANNER
Commissioner of Patents and Trademarks